United States Patent [19]
Kida et al.

[11] Patent Number: 5,783,510
[45] Date of Patent: Jul. 21, 1998

[54] MONOLITHIC REFRACTORY COMPOSITION WALL

[75] Inventors: Otojiro Kida; Eri Suzuki, both of Yokohama; Yasushi Ono, Takasago, all of Japan

[73] Assignee: Asahi Glass Company Ltd., Tokyo, Japan

[21] Appl. No.: 671,546

[22] Filed: Jun. 27, 1996

[30] Foreign Application Priority Data

Jul. 4, 1995 [JP] Japan ................ 7-169037

[51] Int. Cl.$^6$ .......................... C01B 35/10
[52] U.S. Cl. ............... 501/127; 501/119; 501/124; 501/125; 501/128
[58] Field of Search ............... 501/127, 128, 501/124, 125, 119, 94

[56] References Cited

U.S. PATENT DOCUMENTS

| | | | |
|---|---|---|---|
| 4,222,782 | 9/1980 | Alliegro et al. | 501/119 |
| 4,280,844 | 7/1981 | Shikano et al. | 501/43 |
| 4,306,030 | 12/1981 | Watanabe et al. | 501/101 |
| 5,284,808 | 2/1994 | Damiano et al. | 501/128 |
| 5,338,712 | 8/1994 | MacMillan et al. | 501/94 |
| 5,366,944 | 11/1994 | Rumpeltin et al. | |
| 5,559,063 | 9/1996 | Sarma | 501/118 |

FOREIGN PATENT DOCUMENTS

| | | |
|---|---|---|
| 53-66917 | 6/1978 | Japan . |
| 54-118412 | 9/1979 | Japan . |
| 55-109281 | 8/1980 | Japan . |
| 56-50172 | 5/1981 | Japan . |
| 58-2270 | 1/1983 | Japan . |
| 58-120573 | 7/1983 | Japan . |
| 58-199770 | 11/1983 | Japan . |
| 58-49511 | 11/1983 | Japan . |
| 58-217472 | 12/1983 | Japan . |
| 59-190276 | 10/1984 | Japan . |
| 60-235770 | 11/1985 | Japan . |
| 61-38154 | 8/1986 | Japan . |
| 61-40622 | 9/1986 | Japan . |
| 62-36071 | 2/1987 | Japan . |
| 62-100483 | 5/1987 | Japan . |
| 63-396 | 1/1988 | Japan . |
| 2-27308 | 6/1990 | Japan . |
| 2-199070 | 8/1990 | Japan . |
| WO 92/17419 | 10/1992 | WIPO . |

OTHER PUBLICATIONS

Database WPI, Derwent Publications, AN 90-280295, JP-A-02 199 070, Aug. 7, 1990.

Database WPI, Derwent Publications, AN 84-085231, JP-A-59 035 068, Feb. 25, 1984.

Database WPI, Derwent Publications, AN 82-00696j, JP-A-57 166 362, Oct. 13, 1982.

*Primary Examiner*—Karl Group
*Attorney, Agent, or Firm*—Oblon, Spivak, McClelland, Maier & Neustadt, P.C.

[57] ABSTRACT

A monolithic refractory composition, which can be rapidly dried after being mixed with water and applied to a desired portion by casting or spraying to form a furnace wall, and which comprises refractory aggregates, a refractory powder, an aluminum alloy powder and a dispersant, wherein the aluminum alloy powder is contained in an amount of from 0.04 to 5 parts by weight per 100 parts by weight of the total amount of the refractory aggregates and the refractory powder.

9 Claims, No Drawings

MONOLITHIC REFRACTORY COMPOSITION WALL

The present invention relates to a monolithic refractory composition for refractories which are useful as lining materials for various furnaces, lining materials for refining containers such as ladles or lining materials for refining lances or troughs, which are free from explosion during heat drying, and a process for forming a furnace wall by means of such a composition.

Monolithic refractories have been widely employed in recent years, since the man power required for their application is little, they can be applied in optional shapes, and the properties of refractories have been improved. Especially, cast refractories are presently most commonly used as monolithic refractories, since their applicability is excellent, and the unit cost and unit material can now be remarkably reduced owing to an improvement in the technology for densification to improve the useful life and owing to reworkability of used material.

With respect to cast refractories, various bonding methods have been practically employed owing to recent developments in materials and application techniques, and it has been made possible to obtain a lining having a dense structure by a combination with various ultrafine powders, dispersants or flocculants. However, such a dense cast refractory lining has a problem that when it is heated for drying to quickly remove water mixed for application, steam is likely to be trapped in the interior of the lining during the temperature rise, and the lining is likely to crack or break due to the steam pressure (hereinafter referred to as explosion or a explosion phenomenon). Therefore, drying of a cast dense refractory is carried out slowly over a long period of time, and it takes a correspondingly long working period for the application. To shorten the working period by preventing the explosion phenomenon, a technique to prevent explosion has been proposed in which an aluminum powder (hereinafter referred to as Al powder) is added to cast refractories, so that $H_2$ gas is generated by the reaction of Ca+ contained in aluminous cement with an aqueous alkaline solution, to form gas permeable pores through which steam may be released (e.g.Japanese Examined Patent Publication No. 38154/1986).

However, if Al powder is added, the lining is likely to expand to form a porous body due to the pressure of $H_2$ gas generated. Further, due to the pressure of $H_2$ gas, cracking is likely to form in the internal structure of the refractories, and the composition for cast refractories having Al powder added thereto, lacks in storage stability, since the activity of Al powder is high. Furthermore, with cast refractories having Al powder added thereto, it has been difficult to obtain a lining of refractories having constant quality, due to the influence of the exothermic reaction which is variable depending upon the application temperature or the type of the aluminous cement to be incorporated.

Al powder is highly active so that the reaction proceeds too quickly. Accordingly, it has been proposed to control the reaction by coating the surface of Al powder particles with e.g. an organic substance (e.g.Japanese Unexamined Patent Publication No. 120573/1983). Further, when Al powder is used for the purpose of preventing explosion, hydrogen thereby generated is inflammable, and if the application is carried out in a closed space, an explosion is likely to occur. Accordingly, a due care will be required.

The method of coating the surface of Al powder particles with an organic substance, proposed as a method for solving such problems, is effective for improving the storage stability, but it is still difficult to control the timing for generating $H_2$ gas, and it is difficult to uniformly distribute $H_2$ gas bubbles throughout the castable material, whereby large bubbles are likely to be formed locally to deteriorate the useful life of refractories.

Recently, as a safer explosion-preventing technique than Al powder, a method of forming gas permeable pores by adding organic or inorganic fibers to the composition, has been proposed (e.g.Japanese Unexamined Patent Publication No. 190276/1984). Further, Japanese Unexamined Patent Publication No. 100483/1987 proposes a method for preventing explosion, which comprises incorporating a basic aluminum lactate in addition to Al powder, to form fine cracks in the refractory structure thereby to form gas permeable pores.

However, the method of adding organic fibers, proposed as a safe method free from explosion due to inflammation of $H_2$ gas generated, has drawbacks such that the dispersibility of organic fibers in the batch is poor, the amount of the organic fibers to be incorporated is limited, for example, for a reason that the amount of water required at the time of the application increases and the useful life of the refractories tends to be impaired, and it is thus difficult to obtain an excellent refractory lining.

Further, the method of adding a basic aluminum lactate, has a problem that since the shrinkage during drying is substantial, laminar cracking is likely to occur in the lining, whereby the useful life of the refractories will be impaired.

Further, it has been proposed to add an aluminum-silicon alloy powder to monolithic refractories (Japanese Unexamined Patent Publication No. 217472/1983). However, here, the aluminum-silicon alloy powder is used for the purposes of strengthening a joint portion of the applied refractories and improving the resistance against mechanical and chemical wearing off at a high temperature, and there is no suggestion for solving the problems which occur during the heating and drying the applied monolithic refractories.

On the other hand, spray application of refractories requires no forms as opposed to cast refractories and thus has a merit that the man power can be remarkably saved in the application operation. Accordingly, spray application of refractories has already been practically employed in some areas. Such conventional spray refractories include, for example, the one containing aluminous cement, the one having a hardening accelerator such as a lithium salt or sodium aluminate incorporated thereto, the one having a hardening agent such as sodium silicofluoride or condensed aluminum phosphate combined to water glass, and the one having aluminum phosphate or various alkali metal phosphates combined to water glass.

However, conventional application methods are so-called dry or semi-wet spray application methods, as disclosed in Japanese Examined Patent Publication No. 27308/1990 and Japanese Unexamined Patent Publication No. 36071/1987. Namely, a batch composed of a dry composition or a wet composition having water mixed in such an amount not to impart flowability, is transported to a spray nozzle at the application field by a piping by means of compressed air as a carrier, and spray application of refractories is carried out by the spray nozzle while injecting whole necessary water or supplemental amount of water required by the batch and a rapid setting agent at the spray nozzle or before the spray nozzle.

However, by such a method, fine particles of e.g. less than 0.1 mm in the composition, tend to be applied by spraying in an inadequately dispersed or wetted state, and a large amount of air tends to be included in the applied batch of refractories. As a result, the resulting refractories will have a high porosity as compared with refractories formed by casting. As the porosity is high, they tend to be inferior in the refractory properties such as corrosion resistance. Further, there has been a working environmental problem such that dust is scattered during application, and the application yield has been poor with a substantial amount of rebound loss.

On the other hand, it has been attempted to produce a dense lining having a low porosity by improving the spray nozzle or the spray technique (apparatus).

However, it has been found that since the sprayapplied lining of refractories has a high density, water in the lining is trapped in the lining in the state of steam during the drying operation or use, and if the lining is rapidly heated, the explosion is likely to result due to an increase of the steam pressure.

It is an object of the present invention to provide a cast or spray refractory composition which is capable of solving the above problems and which is capable of forming a furnace wall of a dense monolithic refractory without a danger of explosion even when subjected to rapid heating and drying.

In a first aspect, the present invention provides a monolithic refractory composition, which can be rapidly dried after mixed with water and applied to a desired portion by casting or spraying to form a furnace wall, and which comprises refractory aggregates, a refractory powder, an aluminum alloy powder and a dispersant, wherein the aluminum alloy powder is contained in an amount of from 0.04 to 5 parts by weight per 100 parts by weight of the total amount of the refractory aggregates and the refractory powder.

In a second aspect, the present invention provides a self flowable batch prepared by mixing, together with at most 12 parts by weight of water, 100 parts by weight of a monolithic refractory composition comprising refractory aggregates, a refractory powder, an aluminum alloy powder and a dispersant, wherein the aluminum alloy powder is contained in an amount of from 0.05 to 3 parts by weight per 100 parts by weight of the total amount of the refractory aggregates and the refractory powder, said self flowable batch having a flowability such that when the batch immediately after the mixing is fed to fill a truncated cone mold having open upper and lower ends and having an upper end inner diameter of 50 mm, a lower end inner diameter of 100 mm and a height of 150 mm, then the truncated cone mold is withdrawn upward, and the batch is left to stand still for 60 seconds, the mean spread diameter of the batch is at least 190 mm.

In a third aspect, the present invention provides a process for forming a furnace wall, which comprises applying to a predetermined furnace wall-forming portion by casting or spraying, a monolithic refractory batch prepared by mixing a predetermined amount of water to a composition comprising refractory aggregates, a refractory powder, a dispersant and an aluminum alloy powder, wherein the aluminum alloy powder is contained in an amount of from 0.04 to 5, preferably from 0.04 to 3 parts by weight per 100 parts by weight of the total amount of the refractory aggregates and the refractory powder, then heating a refractory thus applied at a temperature rising rate of from 50° to 400° C./hr at the surface of the refractory, wherein the heat treatment is carried out at least until the temperature of the surface of the refractory becomes at least 500° C., to dry the refractory.

Now, the present invention will be described in detail with reference to the preferred embodiments.

Firstly, a monolithic refractory composition for casting (which may be referred to simply as a cast refractory composition) and a process for forming a furnace wall employing it, will be described, in which the monolithic refractory composition of the present invention is applied by casting to a portion desired to have the furnace wall formed.

The cast refractory composition of the present invention comprising refractory aggregates, a refractory powder, an Al alloy powder and a dispersant, is mixed by an addition of water at the time of application and then applied by a casting application method. The refractory aggregates are the main constituting component of refractories, and the refractory powder is a component which fills spaces of the refractory aggregates and constitutes a matrix for binding the refractory aggregates. The dispersant is added to increase the flowability of a batch which is prepared by mixing the composition with water.

As the the refractory aggregates, at least one type of aggregates selected from the group consisting of alumina, bauxite, diaspore, mullite, aluminous shale, shamotte, silica rock, pyrophillite, sillimanite, andalusite, spinel, magnesia, silicon carbide and graphite is preferably employed.

The refractory powder is preferably at least one member selected from the group consisting of aluminous cement, refractory clay, refractory aggregate powder, fumed silica and ultrafine powder alumina.

The refractory powder is preferably a powder having an average particle size of at most 30 µm, so that it is capable of forming a good matrix. Further, it is preferred to incorporate, as a part of such a refractory powder, an ultrafine powder of e.g. alumina or fumed silica having an average particle size of at most 3 µm, preferably at most 1 µm, whereby it is possible to reduce the amount of water to be added to the composition, and it is possible to impart good flowability to the batch i.g. the composition mixed with water.

Further, when aluminous cement is used as a part of the refractory powder, the aluminous cement serves to bond the cast refractories, and it is thereby possible to impart practical strength to the resulting lining within a wide temperature range of from room temperature to a high temperature. Such aluminous cement is preferably incorporated in an amount of from 1 to 10 parts by weight per 100 parts by weight of the total amount of the refractory aggregates and the refractory powder. The aluminous cement preferably has a CaO/$Al_2O_3$ molar ratio of at most 1.3, whereby a sufficiently long useful time can be secured for the mixed batch. Further, when refractory clay is used as a part of the refractory powder, it is possible to obtain a cast refractory composition excellent in the applicability with clay bonding.

In the present invention, the blend proportions of the refractory aggregates and the refractory powder are usually preferably such that the refractory aggregates are from 75 to 95 wt. %, and the refractory powder is from 5 to 25 wt. %.

Further, in order to impart excellent flowability to the mixed batch, it is preferred to incorporate to the composition a dispersant properly selected depending upon the types of the refractory aggregates and the refractory powder used. Further, if a powdery dispersant is used, it is possible to preliminarily add the dispersant to the composition to be packaged in a bag. The dispersant is preferably at least one member selected from the group consisting of polyphosphate salts, poly-carboxylate salts, poly-acrylate salts and β-naphtalensulfonate salts. The dispersant is preferably incorporated in an amount of from 0.02 to 1 part by weight per 100 parts by weight of the total amount of the refractory aggregates and the refractory powder in the composition.

With the cast refractories having aluminous cement incorporated, the hardening time varies depending upon the application temperature or the type of the aluminous cement. For example, there may be a case where hardening is slow at a temperature of not higher than 15° C., a case where hardening is slow at a temperature around 30° C., or a case where hardening proceeds quickly when the temperature exceeds 30° C. To control the hardening time so that application can be carried out without being influenced by the surrounding temperature condition, it is preferred to incorporate a hardening accelerator or a hardening retarder.

As the hardening accelerator, quicklime, lithium carbonate or calcium chloride may preferably be employed. As the hardening retarder, a nitrate, a phosphate, a lignin sulfonate or a gluconate may preferably be employed. Such a hardening accelerator or retarder may be incorporated in an amount within a range of from 0.01 to 1 part by weight per 100 parts by weight of the total amount of the refractory aggregates and the refractory powder, and the amount is preferably adjusted depending upon the application temperature or the type of aluminous cement.

The Al alloy powder to be incorporated to the composition may be any Al alloy powder. However, an aluminum-silicon (Al—Si) alloy powder or an aluminum-magnesium (Al—Mg) alloy powder is preferred. Most preferred from the practical view point is an Al—Si alloy powder. It is also possible to use a combination of the Al—Si alloy powder and the Al—Mg alloy powder. Further, a small amount of a metal powder other than the aluminum powder may be mixed to the Al—Si alloy powder or the Al—Mg alloy powder to such an extent not to impair the effects intended by the present invention.

In the present invention, with the composition having the Al alloy powder incorporated, it is possible to adjust the amount and the timing for generation of $H_2$ gas. This is attributable to the fact that the Si or Mg component contained in the Al alloy controls the reactivity of the Al component to control generation of $H_2$ gas. Thus, generation of $H_2$ gas is less influenced by the application temperature or the type of aluminum cement, as compared with the case where Al powder is incorporated, and the reaction for generation of $H_2$ gas takes place mildly, whereby gas permeable pores suitable for discharging steam can certainly be formed.

By the presence of formed gas permeable pores, explosion can be avoided even when the lining of cast refractories is rapidly heated at the time of drying. Further, it is readily possible to avoid a danger of inflammation explosion due to generation of $H_2$ gas, as no rapid generation of $H_2$ gas will occur as opposed to refractories having Al powder incorporated. Further, the Al—Si or Mg alloy powder is less reactive with moisture in air than Al powder. Accordingly, the cast refractory composition packaged in a bag has good storage stability.

Further, the Al—Si alloy powder changes finally to $Al_2O_3$ and $SiO_2$ i.e. refractory components. Thus, it is excellent in the properties required for refractories, and the volume increases when the Al—Si alloy powder changes to a $Al_2O_3$ and $SiO_2$, whereby it is possible to obtain a cast refractory furnace wall excellent in the volume stability. Further, in the lining made of the cast refractory composition of the present invention, the Al—Si alloy powder will be oxidized to form $Al_2O_3$ and $SiO_2$ which contribute to the bond strength, whereby it is possible to obtain a refractory furnace wall excellent also in the strength.

Likewise, the Al—Mg alloy powder will finally be converted to refractory components such as $Al_2O_3$, MgO and $MgAl_2O_4$. Thus, it is possible to obtain cast refractories which are excellent in the properties as refractories and which are excellent in the volume stability as the volume increases when the Al—Mg ally powder changes into $Al_2O_3$, MgO and $MgAl_2O_4$. Further, with the lining made of the cast refractory composition of the present invention, the Al—Mg alloy powder will be oxidized to form $Al_2O_3$ and MgO which contribute to the improvement of bond strength, whereby it is possible to obtain refractories excellent also in strength.

The amount of the Al—Si or Mg alloy powder to be added to the composition, is usually from 0.04 to 5, preferably from 0.04 to 3 parts by weight, per 100 parts by weight of the total amount of the refractory aggregates and the refractory powder in the composition. If the amount is less than 0.04 part by weight, generation of $H_2$ gas tends to be small, whereby it tends to be difficult to obtain the effect for preventing explosion. On the other hand, if it exceeds 5 parts by weight, the amount of $H_2$ gas generated tends to be large, whereby bulging or cracking tends to be observed in the refractories after application, and if gas bubbles are generated so much that a porous body will be formed, the strength of the refractory tends to be low. Preferably, the amount of the Al—Si or Mg alloy powder is from 0.04 to 3, more preferably from 0.1 to 2.0 parts by weight.

The Al—Si or Mg alloy powder incorporated in the cast refractory composition of the present invention is preferably the one which comprises from 60 to 95 wt. % of Al and from 5 to 40 wt. % of Si or Mg. If the Si or Mg component in the Al—Si or Mg alloy exceeds 40 wt. %, generation of $H_2$ gas tends to be slow, and the amount of the generated gas tends to be small, whereby the effects for preventing explosion, tend to be small. On the other hand, if the Si or Mg component is less than 5 wt. %, generation of $H_2$ becomes active, and depending upon the components to be incorporated to the composition, bulging or cracking tends to occur in the lining of refractories. More preferably, the Al—Si or Mg alloy powder comprises from 85 to 93 wt. % of Al and from 7 to 15 wt. % of Si or Mg.

The Al—Si or Mg alloy powder incorporated in the cast refractory composition of the present invention, is preferably the one wherein the total amount of the Al component and the Si or Mg component is at least 90 wt. %, and particles having a particle size of at most 0.074 mm are contained in an amount of at least 40 wt. %.

When the total amount of Al and Si or Mg is at least 90 wt. %, it is possible to obtain a desired effect such that a fluctuation in the initiation time of the reaction can be minimized. The total amount of Al and Si or Mg in the Al—Si or Mg alloy is more preferably at least 95 wt. %. Further, when the Al—Si or Mg alloy powder contains at least 40 wt. % of particles having a particle size of at most 0.074 mm, it is possible to obtain an effect for certainly preventing explosion. If the particles having a particle size of at most 0.074 mm, are less than 40 wt. %, generation of $H_2$ gas tends to be small, whereby the effect for preventing explosion tends to be small. More preferably, the Al—Si or Mg alloy powder contains at least 50 wt. % of particles having a particle size of at most 0.074 mm.

The Al—Si or Mg alloy powder is preferably an alloy powder wherein the Al component and the Si or Mg components are uniformly dispersed. Such an alloy powder can be prepared by an atomizing method or a method of pulverizing a melt-solidified product of the alloy.

The amount of water to be mixed to the composition varies depending upon the porosity and the specific gravities of the refractory aggregates and the refractory powder contained in the composition. The amount of water capable of imparting flowability to the batch has a lower limit.

Namely, water is usually required to be in an amount of at least 4 parts by weight per 100 parts by weight of the total amount of the refractory aggregates and the refractory powder. In order to minimize the porosity of the refractories after application and to secure excellent physical properties as refractories, the amount of water to be mixed to the composition is preferably at most 12 parts by weight, more preferably at most 10 parts by weight, per 100 parts by weight of the total amount of the refractory aggregates and the refractory powder. If the amount of water to be mixed to the composition is large, the refractory aggregates tend to sediment, whereby the applied refractories tend to be non-uniform.

The cast refractory composition of the present invention is used in such a manner that water is mixed to the composition having the above-described blend proportions, to impart flowability, and the obtained batch is applied to a portion desired to have a furnace wall formed, by casting (in a case of a composition having no adequate self flowability such as the one wherein the refractory powder is composed solely of aluminous cement or the one having clay added thereto, the application is carried out under vibration), and no explosion phenomenon takes place even when the resulting monolithic refractory after curing the applied lining, is dried at a rapid heating up rate of from 50° to 400° C./hr at the surface of the refractory to the maximum temperature of 1400° C.

If the heating up rate is less than 50° C./hr, the superiority over the conventional drying method is not sufficient, and the drying time may not substantially be shortened. On the other hand, if it exceeds 400° C./hr, a correspondingly large sized drying means will be required, and even if the temperature is raised so quickly, heat accumulation to the furnace wall will be inadequate, and it takes time for complete removal of water. Further, if the temperature rising rate exceeds 400° C./hr, spalling cracks are likely to form on the surface of the monolithic refractory.

The heating up rate can be optionally determined depending upon the blend proportions of the composition, the shape and the thickness of the furnace wall to be formed and operational conditions to which the furnace wall is exposed. In most cases, a heating up rate of at least 100° C./hr is sufficient, and in some cases the heating up rate may be at least 300° C./hr.

The maximum temperature for heating is at a level of 500° C. depending upon the furnace, to form a practically useful furnace wall. However, usually, a desired furnace wall is formed by heating to a maximum temperature of at least 1500° C.

According to the present invention, heating and drying can be carried out at such a rapid heating up rate in a short period of time, which makes quick reoperation of the furnace possible.

In the present invention, the surface temperature for heating for drying, is a temperature measured at a position of from 1 to 2 mm from the surface of the refractory formed as a furnace wall, by a thermometer (usually a thermocouple) embedded in the refractory so that the forward end is located at said position.

In the present invention, the heating up rate is influenced also by the thickness of the monolithic refractory formed. For example, as the thickness increases, a longer period of time is required for drying to the interior.

However, the thickness of the monolithic refractory of the present invention is usually within a range of from 100 to 1,000 mm. Accordingly, when the refractory is heated for drying at a prescribed heating up rate until the surface temperature becomes at least 500° C., the furnace wall can be formed without bringing out explosion or cracking during the heating up and drying operation. Even if a non-dried portion partially remains in the interior, there will be no problem since such portion will be gradually dried during practical use of the furnace.

The monolithic refractory composition of the present invention is usually applied on an inner surface of a furnace comprising a permanent refractory and an heat insulating refractory formed sequentially from the rear side of the furnace.

Now, a monolithic refractory composition for spraying (which may be referred also as a spray refractory composition) will be described, whereby a furnace wall is formed by spraying.

For the process for forming a furnace wall by means of the spray refractory composition of the present invention, the same heating and drying conditions, i.e. the same heating and drying conditions by rapid heating up, as used for the cast refractory composition, may be applied.

The spray refractory composition of the present invention, like the cast refractory composition, comprises refractory aggregates, a refractory powder, an Al alloy powder and a dispersant. Al so in this composition, an Al alloy powder is incorporated. Its purpose and effects are basically the same as in the case of the cast refractory composition.

Further, with respect to the refractory aggregates, the refractory powder and the dispersant, the same types as for the cast refractory composition, may be used.

In the spray refractory composition, the aluminum alloy powder may be somewhat different in the type and the amount from the aluminum alloy powder in the cast refractory composition. Namely, the aluminum alloy powder may comprise from 75 to 95 wt. % of Al and from 5 to 25 wt. % of Si or Mg, preferably from 80 to 93 wt. % of Al and from 7 to 20 wt. % of Si or Mg, and the purity is usually at least 90 wt. % as the total of Al and Si or Mg.

Further, the alloy powder is used usually in an amount of from 0.05 to 5 parts by weight, preferably from 0.1 to 3 parts by weight, per 100 parts by weight of the total amount of the refractory aggregates and the refractory powder.

The spray refractory composition of the present invention is adjusted by an addition of a prescribed amount of water to have self flowability suitable for spraying.

For the spraying operation, the composition is transported through a piping to the application field and applied by spraying, and it is required to maintain the shape upon application.

Flowability desired for the spray refractory composition of the present invention may be defined as follows.

Namely, a batch immediately after mixing the spray refractory composition by an addition of a predetermined amount of water, is fed to fill a truncated cone mold having open upper and lower ends and having an upper end inner diameter of 50 mm, a lower end inner diameter of 100 mm and a height of 150 mm, and then the cone mold is withdrawn upward, whereupon the batch is left to stand still for 60 seconds, whereby the flowability is represented by the spread diameter (the mean value of the spread diameters measured in two directions, the unit being mm, which will be hereinafter referred to as a flow index).

Here, the measurement of the flow index of the batch is carried out in a room of about 20° C. by mixing water of about 20° C. to the composition, and the measurement is completed within three minutes after mixing.

The batch exhibits self flowability when the flow index is at least 165 mm. However, the flow index of the batch to be transported under pressure, is usually adjusted to a level of at least 190 mm, so that the batch can easily and without retention be sent to the application field where a spray nozzle is located, by a force feed pump and a force feed piping. By using a batch having a large flow index, the suction resistance in the force feed pump and the flow resistance in the force feed piping can be made small, whereby the diameter of the force feed piping can be made small, and the batch can be transported for a long distance by force feeding. Accordingly, the flow index is preferably at least 200 mm.

The above condition for the flow index is a preferred condition for the spray refractory composition. However, such a condition is sufficiently advantageous also for the cast refractory composition having self flowability.

Likewise, the amount of water required to impart a desired flow index, may be the same as in the case of the cast refractory composition.

The spray refractory composition is transported to the application field usually in the form of a dried powder packaged in a bag, and at the application field, the composition and water are put into a mixer and mixed to obtain a batch, which is then applied by spraying by means of e.g. the above-mentioned spray application installation. However, it is also possible that the composition is mixed by an addition of water beforehand at a plant, and it is transported in the form of a mixed batch by e.g. a concrete mixer car to the application field and then spray application is carried out.

A rapid setting agent may be used to rapidly hard the spray refractory composition after its application. In such a case, it is preferred to inject the rapid setting agent to the flowable composition at the spray nozzle portion.

The rapid setting agent to be injected to the batch may be in the form of an aqueous solution of the rapid setting agent. However, in order to obtain a refractory having a low porosity by minimizing the amount of water in the batch to be applied by spraying, it is preferred to employ a powdery rapid setting agent. The powdery rapid setting agent is preferably injected to the batch from a rapid setting agent inlet using compressed air as a carrier so that the rapid setting agent will be uniformly dispersed in the batch. For the same reason, when the rapid setting agent is injected to the batch in the form of an aqueous solution, it is preferred to use an aqueous solution having a concentration as high as possible.

As the rapid setting agent, it is possible to use an aluminate such as sodium aluminate, potassium aluminate or calcium aluminate, a carbonate such as sodium carbonate, potassium carbonate, sodium hydrogen carbonate or potassium hydrogen carbonate, a sulfate such as sodium sulfate, potassium sulfate or magnesium sulfate, a calcium aluminate such as $12CaO.7Al_2O_3$, $3CaO.Al_2O_3$ or $11CaO.7Al_2O_3.CaF_2$, calcium oxide, calcium hydroxide, or a composite or mixture thereof.

Among these rapid setting agents, it is preferred to use sodium aluminate, since it is readily available and inexpensive, and its rapid setting properties are stable. Sodium aluminate has a high melting point, whereby refractoriness of the refractories will not be deteriorated, and when injected into the batch, it undergoes hydrolysis to form a gel of $Al(OH)_3$ as well as NaOH, whereby the batch will be rapidly hardened. Further, calcium aluminate preferred as the rapid setting agent is the one wherein the $CaO/Al_2O_3$ molar ratio is at least 1.5.

The amount of the rapid setting agent to be injected, varies depending upon the rapid setting agent to be used. However, it is usually preferably from 0.05 to 3 parts by weight per 100 parts by weight of the total amount of the refractory aggregates and the refractory powder in the composition.

If the amount of the rapid setting agent injected, is less than 0.05 part by weight, the setting speed tends to be inadequate, and the applied batch is likely to flow off, even if a highly effective rapid setting agent is employed. On the other hand, if it exceeds 3 parts by weight, hardening tends to be so rapid that the spray operation tends to be difficult, and refractory properties such as heat resistance and corrosion resistance tend to deteriorate. The amount of the rapid setting agent to be injected is more preferably from 0.1 to 2 parts by weight. The rapid setting properties of the rapid setting agent vary also depending upon its type. Accordingly, the amount is preferable adjusted to a proper level by selecting the type of the rapid setting agent or the length of the spray piping after injection of the rapid setting agent.

The cast or spray refractory composition of the present invention containing a predetermined amount of the Al—Si or Mg alloy powder per 100 parts by weight of the total amount of the refractory aggregates and the refractory powder in the composition, has good storage stability, since the activity of the Al—Si Mg alloy and the powder is smaller than that of Al powder, and with the batch having water mixed to this composition, the Al—Si or Mg alloy powder reacts with an aqueous alkaline solution more mildly than Al powder, and passages for discharging steam at the time of drying the applied lining, are secured, whereby the applied lining will not explode even when dried by rapidly raising the temperature. It is thereby possible to obtain a refractory furnace wall which is dense and has excellent high temperature properties.

Accordingly, a long drying time required in the prior art will be unnecessary, and quick drying by direct flame may be employed, and the working period can be substantially shortened. Further, the unit cost can be reduced, and the application operation and the environmental safety can be improved.

The batch for spraying of the present invention having self flowability, can be transported by a force feed pump, and the sprayed. Accordingly, the porosity of the applied lining can be substantially reduced as compared with the porosity of the lining applied by the conventional spray application method, whereby it is possible to obtain a lining having a bulk density comparable to the refractory applied by casting. As the rebound loss is little, the application yield is high. Further, dust scattered therearound, is remarkably little, and the working environment is excellent.

Further, even when the spray application is carried out under a warm or hot condition, the resulting lining will not explode or peel and makes a refractory having a high bulk density and excellent corrosion resistance. Thus, it is suitable also as repairing refractories for e.g. a ladle, a tandish, or hot metal trough.

Now, the present invention will be described in further detail with reference to Examples. However, it should be understood that the present invention is by no means restricted to such specific Examples.

EXAMPLES 1 TO 22

Comparison of Cast Refractory Compositions of
the Present Invention Using an Aluminum-Silicon
Alloy Powder, Capable of Being Rapidly Heated
and Dried, With Comparative Examples Examples 1 to 7, 12 to 15 and 18 to 20 represent Examples of the present invention and Examples 8 to 11, 16 to 17 and 21 to 22 represent Comparative Examples.

As refractory aggregates, bauxite aggregates were used which had an $Al_2O_3$ content of 89 wt. %, a $SiO_2$ content of 7 wt. % and a $Fe_2O_3$ content of 1.3 wt. % and which comprised coarse particles having a particle size of from 1.68 to 5 mm, intermediate particles having a particle size of from 0.1 to 1.68 and fine particles having a particle size of from 0.02 to 0.1 mm and an average particle size of 0.03 mm.

As the refractory powder constituting the matrix of a refractory, aluminous cement having an average particles size of 9 μm and an $Al_2O_3$ content of 55 wt. % and a CaO content of 36 wt. %, Bayer alumina having a purity of $Al_2O_3$ of 99.6 wt. % and an average particle size of 4.3 μm, and fumed silica having purity of $SiO_2$ of 93 wt. % and an average particles size of 0.8 μm, were employed. As the dispersant, a powder of sodium tetraphosphate ($Na_6P_4O_{13}$) was employed which had a $P_2O_5$ content of 60.4 wt. % and a $Na_2O$ content of 39.6 wt. %.

As the Al—Si alloy powder, an alloy powder (a) comprising 80 wt. % of an Al component and 20 wt. % of a Si component, and an alloy powder (b) comprising 90 wt. % of an Al component and 10 wt. % of a Si component, were employed. The average particle sizes of the Al—Si alloy powders (a) and (b) were 28 μm and 30 μm, respectively, and they contained particles having a particle size of at most 0.074 mm in an amount of 92% and 89%, respectively. Al powder used in Comparative Examples were the one having a purity of 99% and an average particle size of 30 μm.

Refractory aggregates, a refractory powder, a dispersant, an Al—Si alloy powder and an Al powder were weighed to obtain a cast refractory composition having the formulation (unit: parts by weight) as identified in Table 1, 2 or 3. Then, water was added thereto in the amount (parts by weight) as identified in Table 1, 2 or 3, per 100 parts by weight of the total amount of the refractory aggregates and the refractory powder in the composition, followed by mixing in a universal mixer for three minutes to obtain a batch for cast refractories. This batch was cast into a formwork having an internal size of 40 mm×40 mm×160 mm and a formwork having an inner diameter of 100 mm and a height of 100 mm to obtain test specimens for cast refractories (Examples 1 to 11).

With respect to Examples 1 to 11 having self flowability, the flowability of each batch for cast refractories was determined in such a manner that a batch immediately after mixing is fed to fill a truncated cone mold having open upper and lower ends and having an upper end inner diameter of 50 mm, a lower end inner diameter of 100 mm and a height of 150 mm, then the cone mold is withdrawn upward, and the batch is left to stand still for 60 seconds, whereupon spread diameters of the batch were measured in two directions by a caliper, and the average value was taken as the batch flow index.

The apparent porosity and the bulk density were measured in accordance with the methods stipulated in JIS R2205 after drying each test specimen at 110° C. for 24 hours.

The flexural strength was measured with respect to a test specimen having a size of 40 mm×40 mm×160 mm which was cured at room temperature and a test specimen having the same size which was dried and then fired at 1,400° C. for one hour.

The dimensional change was determined in such a manner that the dimensional change in a test specimen which was fired at 1,400° C. for one hour was measured, and represented by the ratio based on the size before firing. "Bulge" shown in a Table means that a distinct bulge of a few % was observed.

The presence or absence of cracking represents the result of examination of the outer appearance of a test specimen removed from the forms after hardening.

The explosion resistance was evaluated in such a manner that a test specimen having a diameter of 100 mm and a height of 100 mm taken out from the forms was put into an electric furnace maintained at 1,200° C., whereupon the presence or absence of explosion was examined.

Examples 12 to 17 represent test results of cast refractories wherein aluminous cement as a refractory powder was incorporated excessively, and no other refractory powder was incorporated, whereby self flowability was not sufficient. The batch flow index of cast refractories in each of Examples 12 to 17 (as well as Examples 18 to 22) was determined in such a manner that using a flow cone stipulated in JIS R5201, the batch immediately after mixing was fed to fill the flow cone mounted on a vibrating table, then a vibration of 3G was exerted thereto, and upon expiration of 10 seconds, spread diameters of the batch were measured in two directions by a caliper, and the mean value was taken as the flow index. The evaluation methods for other items with respect to Examples 12 to 17 were the same as in Examples 1 to 11.

Examples 18 to 22 represent test results of cast refractories in which refractory clay was incorporated. The refractory aggregates, the refractory powder and other materials used were the same as in Examples 1 to 11, and the evaluation methods were the same as in Example 12.

It is evident from Tables 1, 2 and 3, when cast refractory compositions containing an Al—Si alloy powder of the present invention are employed, gas permeable pores for discharging steam are secured even if the applied refractories are dense, and bulging or cracking will not form which is likely to result due to generation of $H_2$ gas in the case of casting refractories containing Al powder, and no explosion takes place even when the applied refractories are dried under a rapidly heating condition. The physical properties of the applied cast refractories are excellent since they are dense. Whereas, cast refractories containing Al powder have problems such that when the content of Al powder is large, bulging or cracking occurs, and the preferred content of Al powder varies depending upon the mixing temperature of the batch.

TABLE 1

| Examples | 1 | 2 | 3 | 4 | 5 | 6 | 7 | 8 |
|---|---|---|---|---|---|---|---|---|
| Bauxite coarse particles | 31 | 31 | 31 | 31 | 31 | 31 | 31 | 31 |
| Bauxite intermediate particles | 25 | 25 | 25 | 25 | 25 | 25 | 25 | 25 |
| Bauxite fine particles | 23 | 23 | 23 | 23 | 23 | 23 | 23 | 23 |
| Aluminous cement | 8 | 8 | 8 | 8 | 8 | 8 | 8 | 8 |
| Bayer alumina | 7 | 7 | 7 | 7 | 7 | 7 | 7 | 7 |
| Fumed silica | 6 | 6 | 6 | 6 | 6 | 6 | 6 | 6 |
| 90Al-10Si alloy powder | 0.05 | 0.1 | 0.5 | 1 | 2 | — | — | — |
| 80Al-20Si alloy powder | — | — | — | — | — | 0.5 | 1 | 0.03 |
| Al powder | — | — | — | — | — | — | — | — |

TABLE 1-continued

| Examples | 1 | 2 | 3 | 4 | 5 | 6 | 7 | 8 |
|---|---|---|---|---|---|---|---|---|
| Dispersant | 0.1 | 0.1 | 0.1 | 0.1 | 0.1 | 0.1 | 0.1 | 0.1 |
| Water content | 8 | 8 | 8 | 8 | 8 | 8 | 8 | 8 |
| Batch flow index (mm) | >245 | >245 | >245 | >245 | >245 | >245 | >245 | >245 |
| Apparent porosity (%) | 12.1 | 12.0 | 12.5 | 12.6 | 13.0 | 12.3 | 12.7 | 11.8 |
| Bulk density (g/cc) | 2.85 | 2.85 | 2.83 | 2.83 | 2.84 | 2.84 | 2.82 | 2.85 |
| Flexural strength (kg/cm$^2$) | | | | | | | | |
| After curing | 120 | 118 | 123 | 125 | 115 | 115 | 118 | 120 |
| After 1,400° C. × 1 hr | 400 | 400 | 412 | 400 | 398 | 398 | 400 | 405 |
| Dimensional change (%) | 0.03 | 0.05 | 0.05 | 0.07 | 0.07 | 0.03 | 0.05 | 0.03 |
| Cracking | Nil | Nil | Nil | Nil | Nil | Nil | Nil | Nil |
| Explosion | Nil | Nil | Nil | Nil | Nil | Nil | Nil | Present |

TABLE 2

| Examples | 9 | 10 | 11 | 12 | 13 | 14 | 15 | 16 |
|---|---|---|---|---|---|---|---|---|
| Bauxite coarse particles | 31 | 31 | 31 | 35 | 35 | 35 | 35 | 35 |
| Bauxite intermediate particles | 25 | 25 | 25 | 27 | 27 | 27 | 27 | 27 |
| Bauxite fine particles | 23 | 23 | 23 | 25 | 25 | 25 | 25 | 25 |
| Aluminous cement | 8 | 8 | 8 | 13 | 13 | 13 | 13 | —13 |
| Bayer alumina | 7 | 7 | 7 | — | — | — | — | — |
| Fumed silica | 6 | 6 | 6 | — | — | — | — | — |
| 90Al-10Si alloy powder | 3.5 | — | — | 0.1 | 0.5 | 1 | 2 | — |
| 80Al-20Si alloy powder | — | — | — | — | — | — | — | — |
| Al powder | — | 1 | — | — | — | — | — | — |
| Dispersant | 0.1 | 0.1 | 0.1 | — | — | — | — | — |
| Water content | 8 | 8 | 8 | 6 | 6 | 6 | 6 | 6 |
| Batch flow index (mm) | >245 | >245 | >245 | >220 | >220 | >220 | >220 | >220 |
| Apparent porosity (%) | 13.4 | 15.4 | 12.0 | 14.5 | 14.8 | 15.0 | 15.2 | 14.9 |
| Bulk density (g/cc) | 2.75 | 2.68 | 2.85 | 2.76 | 2.74 | 2.78 | 2.76 | 2.75 |
| Flexural strength (kg/cm$^2$) | | | | | | | | |
| After curing | 105 | 85 | 120 | 110 | 105 | 103 | 100 | 100 |
| After 1,400° C. × 1 hr | 320 | 200 | 410 | 410 | 420 | 416 | 415 | 430 |
| Dimensional change (%) | Bulge | Bulge | 0.03 | 0.01 | 0.02 | 0.04 | 0.05 | −0.01 |
| Cracking | Present | Present | Nil | Nil | Nil | Nil | Nil | Nil |
| Explosion | Nil | Nil | Present | Nil | Nil | Nil | Nil | Present |

TABLE 3

| Examples | 17 | 18 | 19 | 20 | 21 | 22 |
|---|---|---|---|---|---|---|
| Bauxite coarse particles | 35 | 35 | 35 | 35 | 35 | 35 |
| Bauxite intermediate particles | 27 | 30 | 30 | 30 | 30 | 30 |
| Bauxite fine particles | 25 | 25 | 25 | 25 | 25 | 25 |
| Aluminous cement | 13 | 1 | 1 | 1 | 1 | 1 |
| Refractory clay | — | 5 | 5 | 5 | 5 | 5 |
| Bayer alumina | — | 3 | 3 | 3 | 3 | 3 |
| Fumed silica | — | 1 | 1 | 1 | 1 | 1 |
| 80Al-20Si alloy powder | — | 0.1 | 0.5 | 1 | — | — |
| Al powder | 1 | — | — | — | — | 0.5 |
| Dispersant | — | 0.1 | 0.1 | 0.1 | 0.1 | 0.1 |
| Water content | 6 | 5 | 5 | 5 | 5 | 5 |
| Batch flow index (mm) | >220 | >220 | >220 | >220 | >220 | >220 |
| Apparent porosity (%) | 17.4 | 16.0 | 16.2 | 16.4 | 16.5 | 18.8 |
| Bulk density (g/cc) | 2.54 | 2.75 | 2.74 | 2.70 | 2.74 | 2.56 |
| Flexural strength (kg/cm$^2$) | | | | | | |
| After curing | 80 | 25 | 24 | 27 | 25 | 18 |
| After 1,400° C. × 1 hr | 210 | 415 | 420 | 420 | 430 | 350 |
| Dimensional change (%) | Bulge | 0.02 | 0.04 | 0.03 | −0.02 | Bulge |
| Cracking | Present | Nil | Nil | Nil | Nil | Present |
| Explosion | Nil | Nil | Nil | Nil | Present | Nil |

EXAMPLES 23 TO 44

Comparison of Cast Refractory Compositions Employing an Aluminum-Magnesium Alloy Powder, Capable of Being Rapidly Heated For Drying, With Comparative Examples Examples 23 to 30, 32 to 37 and 40 42 represent Examples of the present invention, and Examples 30 to 33, 38 to 39 and 43 to 44 represent Comparative Examples. (Comparative Examples 32, 33, 43 and 44 are the same as previous Comparative Examples 10, 11, 21 and 22, respectively.)

As refractory aggregates, bauxite aggregates which had an $Al_2O_3$ content of 89 wt. %, a $SiO_2$ content of 7 wt. % and a $Fe_2O_3$ content of 1.3 wt. % and which comprised coarse particles having a particle size of from 1.68 to 5 mm, intermediate particles having a particle size of from 0.1 to 1.68 mm, and fine particles having a particle size of from 0.02 to 0.1 mm and an average particle size of 0.03 mm, and spinel aggregates which had an $Al_2O_3$ content of 73 wt. % and a MgO content of 26 wt. % and which comprised intermediate particles having a particle size of from 0.1 to 1.68 mm, and fine particles having a particle size of from 0.02 to 0.1 mm and an average particle size of 0.05 mm, were used.

As the refractory powder constituting the matrix of the refractories, the same aluminous cement, Bayer alumina and fumed silica as used in foregoing Examples 1 to 22, were used.

The dispersant used was the same as used in the previous Examples.

As an Al—Mg alloy powder, an alloy powder (a) comprising 80 wt. % of an Al component and 20 wt. % of a Mg component, and an alloy powder (b) comprising 90 wt. % of an Al component and 10 wt. % of a Mg component, were employed. The average particle sizes of the Al—Mg alloy powders (a) and (b) were 28 µm and 30 µm, respectively, and they contained particles having a particle size of at most 0.074 mm in an amount of 92% and 89%, respectively. The Al powder used in Comparative Examples was the one having a purity of 99%, and an average particle size of 30 µm.

Using the compositions as identified in Tables 4, 5 and 6, test specimens were prepared in the same manner as in the previous Examples. The flow index, the apparent porosity, the bulk density, the flexural strength, the dimensional change, the presence or absence of cracking and the presence or absence of explosion were measured by the same methods as in the previous Examples.

It is evident from Tables 4, 5 and 6 that when cast refractory compositions containing an Al—Mg alloy powder of the present invention are used, substantially the same results as in the case where an Al—Si alloy powder was used, are obtainable i.e. gas permeable pores for discharging steam during drying are secured even if the applied refractories are dense, and bulging or cracking will not form which is likely to form due to generation of $H_2$ gas in the case of cast refractories containing Al powder, and no explosion will occur even when the applied refractories are dried under a rapidly heating condition. The physical properties of the applied test refractories were excellent, since they were dense.

TABLE 4

| Examples | 23 | 24 | 25 | 26 | 27 | 28 | 29 | 30 |
|---|---|---|---|---|---|---|---|---|
| Bauxite coarse particles | 31 | 31 | 31 | 31 | 31 | 31 | 31 | 31 |
| Bauxite intermediate particles | 25 | 25 | 25 | 25 | 25 | 25 | 25 | 25 |
| Bauxite fine particles | 23 | 23 | 23 | 23 | 23 | 23 | 23 | 23 |
| Aluminous cement | 8 | 8 | 8 | 8 | 8 | 8 | 8 | 8 |
| Bayer alumina | 7 | 7 | 7 | 7 | 7 | 7 | 7 | 7 |
| Fumed silica | 6 | 6 | 6 | 6 | 6 | 6 | 6 | 6 |
| 90Al-10Mg alloy powder | 0.05 | 0.1 | 0.5 | 1 | 2 | — | — | — |
| 80Al-20Mg alloy powder | — | — | — | — | — | 0.5 | 1 | 0.03 |
| Dispersant | 0.1 | 0.1 | 0.1 | 0.1 | 0.1 | 0.1 | 0.1 | 0.1 |
| Water content | 8 | 8 | 8 | 8 | 8 | 8 | 8 | 8 |
| Batch flow index (mm) | >245 | >245 | >245 | >245 | >245 | >245 | >245 | >245 |
| Apparent porosity (%) | 12.1 | 12.3 | 12.5 | 12.8 | 13.5 | 12.4 | 12.9 | 11.5 |
| Bulk density (g/cc) | 2.85 | 2.84 | 2.83 | 2.82 | 2.78 | 2.83 | 2.81 | 2.84 |
| Flexural strength (kg/cm$^2$) | | | | | | | | |
| After curing | 121 | 115 | 123 | 120 | 115 | 113 | 117 | 120 |
| After 1,400° C. × 1 hr | 400 | 400 | 410 | 410 | 405 | 400 | 405 | 400 |
| Dimensional change (%) | 0.03 | 0.04 | 0.05 | 0.07 | 0.08 | 0.03 | 0.04 | 0.03 |
| Cracking | Nil | Nil | Nil | Nil | Nil | Nil | Nil | Nil |
| Explosion | Nil | Nil | Nil | Nil | Nil | Nil | Nil | Present |

TABLE 5

| Examples | 31 | 32 | 33 | 34 | 35 | 36 | 37 | 38 |
|---|---|---|---|---|---|---|---|---|
| Bauxite coarse particles | 31 | 31 | 31 | 40 | 40 | 40 | 40 | 40 |
| Bauxite intermediate particles | 25 | 25 | 25 | 6 | 6 | 6 | 6 | 6 |

TABLE 5-continued

| Examples | 31 | 32 | 33 | 34 | 35 | 36 | 37 | 38 |
|---|---|---|---|---|---|---|---|---|
| Bauxite fine particles | 23 | 23 | 23 | 15 | 15 | 15 | 15 | 15 |
| Spinel intermediate particles | — | — | — | 20 | 20 | 20 | 20 | 20 |
| Spinel fine particles | — | — | — | 6 | 6 | 6 | 6 | 6 |
| Aluminous cement | 8 | 8 | 8 | 13 | 13 | 13 | 13 | 13 |
| Bayer alumina | 7 | 7 | 7 | — | — | — | — | — |
| Fumed silica | 6 | 6 | 6 | — | — | — | — | — |
| 90Al-10Mg alloy powder | 3.5 | — | — | 0.1 | 0.5 | 1 | 2 | — |
| Al powder | — | 1 | — | — | — | — | — | — |
| Dispersant | 0.1 | 0.1 | 0.1 | — | — | — | — | — |
| Water content | 8 | 8 | 8 | 6 | 6 | 6 | 6 | 6 |
| Batch flow index (mm) | >245 | >245 | >245 | >215 | >215 | >215 | >215 | >215 |
| Apparent porosity (%) | 13.8 | 15.4 | 12.0 | 14.5 | 14.9 | 15.0 | 15.3 | 14.9 |
| Bulk density (g/cc) | 2.74 | 2.68 | 2.85 | 2.75 | 2.75 | 2.74 | 2.73 | 2.75 |
| Flexural strength (kg/cm$^2$) | | | | | | | | |
| After curing | 100 | 85 | 120 | 110 | 105 | 103 | 98 | 100 |
| After 1,400° C. × 1 hr | 315 | 200 | 410 | 415 | 420 | 410 | 405 | 430 |
| Dimensional change (%) | Bulge | Bulge | 0.03 | 0.01 | 0.02 | 0.04 | 0.05 | —0.01 |
| Cracking | Present | Present | Nil | Nil | Nil | Nil | Nil | Nil |
| Explosion | Nil | Nil | Present | Nil | Nil | Nil | Nil | Present |

TABLE 6

| Examples | 39 | 40 | 41 | 42 | 43 | 44 |
|---|---|---|---|---|---|---|
| Bauxite coarse particles | 40 | 35 | 35 | 35 | 35 | 35 |
| Bauxite intermediate particles | 6 | 30 | 30 | 30 | 30 | 30 |
| Bauxite fine particles | 15 | 25 | 25 | 25 | 25 | 25 |
| Spinel intermediate particles | 20 | — | — | — | — | — |
| Spinel fine particles | 6 | — | — | — | — | — |
| Aluminous cement | 13 | 1 | 1 | 1 | 1 | 1 |
| Refractory clay | — | 5 | 5 | 5 | 5 | 5 |
| Bayer alumina | — | 3 | 3 | 3 | 3 | 3 |
| Fumed silica | — | 1 | 1 | 1 | 1 | 1 |
| 80Al-20Mg alloy powder | — | 0.1 | 0.5 | 1 | — | — |
| Al powder | 1 | — | — | — | — | 0.5 |
| Dispersant | — | 0.1 | 0.1 | 0.1 | 0.1 | 0.1 |
| Water content | 6 | 5 | 5 | 5 | 5 | 5 |
| Batch flow index (mm) | >215 | >205 | >205 | >205 | >205 | >205 |
| Apparent porosity (%) | 17.4 | 16.1 | 16.2 | 16.7 | 16.5 | 18.8 |
| Bulk density (g/cc) | 2.54 | 2.76 | 2.75 | 2.72 | 2.74 | 2.56 |
| Flexural strength (kg/cm$^2$) | | | | | | |
| After curing | 80 | 25 | 28 | 24 | 25 | 18 |
| After 1,400° C. × 1 hr | 210 | 410 | 420 | 425 | 430 | 350 |
| Dimensional change (%) | Bulge | 0.02 | 0.03 | 0.04 | –0.02 | Bulge |
| Cracking | Present | Nil | Nil | Nil | Nil | Present |
| Explosion | Nil | Nil | Nil | Nil | Present | Nil |

In the following Examples, some of the compositions of the previous Examples were used for application to the inner surface of a furnace, followed by rapid heating for drying. However, the method for forming a furnace wall of the present invention is by no means restricted by such specific Examples.

EXAMPLES 45 AND 46

The compositions of Examples 3 and 24 were, respectively, applied to minitandish furnaces. Each composition was applied in a thickness of 250 mm over an area of 1,000×1,000 mm on the inner surface of a heat insulating castable refractory formed in a thickness of 100 mm on the rear side. After curing the applied monolithic refractory, the surface of the applied refractory was heated by an oil burner. The heating for drying was carried out in each case at a heating up rate of 200° C./hr at the surface until the surface temperature became 1,000° C.

The temperature distribution in the minitandish furnace was ±20° C.

In each case, no explosion occurred during the drying operation, and upon completion of the drying, no crack was observed on the surface of the furnace wall thus formed.

The furnace wall was cut out, and the cross section in the thickness direction was inspected, whereby no crack was observed.

EXAMPLES 47 AND 48

The monolithic refractory compositions of Examples 7 and 28 were, respectively, applied to minitandish furnaces, and drying tests were carried out, in the same manner as in Examples 45 and 46. In this case, the surface temperature of the furnace wall was raised at a heating up rate of 300° C./hr to 1,400° C. for drying. In each case, no explosion occurred during the drying operation, and after completion of the drying, no crack was observed on the surface or the cross section of the furnace wall.

EXAMPLES 49 AND 50

The monolithic refractory compositions of Examples 18 and 41 were, respectively, applied, while exerting a vibration, to minitandish furnaces, and drying tests were carried out, in the same manner as in Examples 45 and 46. In this case, the surface temperature of the furnace wall was raised at a heating up rate of 100° C./hr to 1,000° C. for drying. In each case, no explosion occurred during the drying operation, and after the drying, no crack was observed.

COMPARATIVE EXAMPLES 51 AND 52

The monolithic refractory compositions of Comparative Examples 11 and 33 were, respectively, applied to minitandish furnaces, and drying tests were carried out in the same manner as in Examples 45 and 46. The surface temperature of the furnace wall was raised at a heating up rate of 200° C./hr to 1,200° C. for drying. In each case, explosion occurred during the drying operation, and a part of the furnace wall surface blew off. After completion of the drying, many cracks were observed on the furnace wall.

COMPARATIVE EXAMPLES 53 AND 54

The monolithic refractory compositions of Examples 14 and 36 were, respectively, applied, while exerting a vibration, to minitandish furnaces in the same manner as in Examples 45 and 46, and the surface temperature of each furnace wall was raised at a heating up rate of 500° C./hr to 1,000° C. for drying.

In each case, no explosion was observed during the drying, but after completion of the drying, a numerous cracks which appeared to be spalling, were observed on the surface of the surface wall.

From the foregoing results, an interrelation is observed as between the drying tests by minitandish furnaces and tests on explosion with the compositions, and it has been found that evaluation of the compositions may be applicable to the evaluation of the process for forming a furnace wall under rapid heating condition.

EXAMPLES 55 TO 67

Comparison of Spray Refractory Compositions Employing an Aluminum Silicon or Magnesium Alloy Powder, Capable of Being Rapidly Heated for Drying, With Comparative Examples Examples 55 to 61 and 63 represent Examples of the present invention, and Examples 62 and 64 to 67 represent Comparative Examples. The refractory aggregates, the refractory powder, the aluminum powder and the dispersant were the same as used in Examples 1 to 22. As the Al alloy powder, the one having an Al content of 88 wt. % and a Si content of 12 wt. % (Al alloy powder (a)) and the one having a Al content of 85 wt. % and a Mg content of 15 wt. % (Al alloy powder (b)) were used.

The average particle sizes of the Al alloy powders (a) and (b) were about 30 μm and about 35 μm, respectively, and they contained particles having a particle size of at most 0.074 mm in an amount of 90 wt. % and 88 wt. %, respectively.

As the rapid setting agent, the one which is a powder having an average particles size of about 150 μm and which is a mixture comprising sodium aluminate (containing water of crystallization of about 20%) and sodium carbonate in a weight ratio of 3:1, was used.

In a room of 20° C., the refractory aggregates, the refractory powder, the Al alloy powder and the dispersant were blended to prepare the respective compositions as identified in Tables 7 and 8. Water of about 20° C. was added to each composition in the amount as identified in Table 7 or 8 (in Tables 7 and 8, the refractory aggregates and the refractory powder are shown by wt. %, and others are shown by parts by weight per 100 parts by weight of the total amount of the refractory aggregates and the refractory powder), followed by mixing in a mixer having a capacity of 500 kg for 3 minutes to obtain a batch. The flow index of each batch was measured by the same measuring method as in Examples 1 to 11.

Each batch thus prepared was applied by spraying to a substantially vertical wall surface in a thickness of about 100 mm.

The application by spraying was carried out in such a manner that the batch was transported by a force feed pump through a force feed piping, and the rapid setting agent was injected and mixed thereto at a portion before a spray nozzle, whereupon the mixed batch was sprayed from the spray nozzle.

The spray application method of the present invention was a wet system, whereby a rebound loss and formation of a dust during the spray application were very small as compared with a dry or semi-dry spray application method, whereby the application yield was high, and the working environment was remarkably good.

Then, a test specimen having a size of about 300 mm×300 mm×100 mm was taken from each lining formed by spraying in a thickness of about 100 mm on the wall surface. This test specimen was dried at 110° C. for 24 hours, whereupon the specimen was visually inspected to see the presence or absence of cracking, and then the porosity and the bulk density were measured in accordance with the methods stipulated in JIS R2205.

Further, a test specimen having a diameter of 100 mm and a height of 100 mm was taken from each lining, and the explosion was evaluated with respect to each test specimen. Namely, each test specimen was put into an electric furnace maintained at 1,200° C., and after taking it out, the presence or absence of explosion was examined and evaluated.

The flexural strength was measured with respect to a test specimen having a size of 40 mm×40 mm×150 mm taken from each lining, which was dried at 110° C. for 24 hours, and a test specimen having the same size, which was fired at 1,400° C. for 3 hours. The dimensional change was determined in such a manner that the dimensional change as between before and after firing was measured with respect to the test specimen for flexural strength fired at 1,400° C. for 3 hours, and the results are shown in Tables 9 and 10. "Bulge" shown for the dimensional change in Tables 9 and 10 means that a distinct bulge of a few % was observed.

Each of the spray refractories of Examples 56 to 59 and 61 and Comparative Examples 62 and 64 to 67, was applied by spraying to a furnace wall (temperature: about 500° C.)

assumed to be a slag line portion of a ladle which wore out and required repair, whereby the adhesion to the wall surface to be repaired and the presence or absence of explosion and falling off were examined. The results are shown in Tables 9 and 10.

Examples 64 and 65 represent cases wherein the amount of the rapid setting agent injected was not suitable. In Example 64, the rapid setting agent was inadequate, whereby the batch flowed off from the wall surface, and a satisfactory lining was not obtained. In Example 65, the rapid setting agent was excessive, whereby curing of the batch proceeded rapidly, and the spray application was unstable, and the adhesion to the wall surface was poor, whereby a rebound loss was substantial, and a satisfactory lining was not obtained. Therefore, no measurement of the physical properties could be done with respect to the lining of Example 65.

Example 66 represents a case where Al powder was incorporated, whereby the spray application was carried out without any trouble, but bulging of the lining occurred, and the lining became porous, and cracks were also observed.

It is evident that the physical properties of the linings formed by spray application by the present invention are comparable to the physical properties of linings formed by casting.

Further, a hot spray application test was carried out to simulate repair of a wall surface of a ladle of 500° C., which wore out, whereby with the compositions of Examples 56 to 59, 61 and 63, good adhesion was observed, and no cracking or falling off due to explosion was observed. Further, with the compositions of Examples 62 and 64 to 67, the adhesion was poor, or cracking or falling off due to explosion was observed.

As shown in Tables 9 and 10, when the spray refractories containing an Al alloy powder of the present invention are applied by spraying, dense linings equivalent to the cast refractories can be obtained, and even if the linings are dense, gas permeable pores discharging steam are secured in the linings, whereby even when the linings are dried under a rapid heating temperature condition, no explosion occurs. Further, the refractory properties such as corrosion resistance of the linings are excellent, since the linings are dense with a small porosity.

TABLE 7

| Examples | 55 | 56 | 57 | 58 | 59 | 60 | 61 |
|---|---|---|---|---|---|---|---|
| Refractory aggregates | | | | | | | |
| Bauxite coarse particles | 31 | 31 | 31 | 31 | 31 | 31 | 31 |
| Bauxite intermediate particles | 25 | 25 | 25 | 25 | 25 | 25 | 25 |
| Bauxite fine particles | 23 | 23 | 23 | 23 | 23 | 23 | 23 |
| Refractory powder | | | | | | | |
| Aluminous cement | 8 | 8 | 8 | 8 | 8 | 8 | 8 |
| Bayer alumina | 7 | 7 | 7 | 7 | 7 | 7 | 7 |
| Fumed silica | 6 | 6 | 6 | 6 | 6 | 6 | 6 |
| 88Al-12Si alloy powder (a) | 0.05 | 0.1 | 0.5 | 1 | 2 | — | — |
| 85Al-15Mg alloy powder (b) | — | — | — | — | — | 0.5 | 1 |
| Al powder | — | — | — | — | — | — | — |
| Dispersant | 0.01 | 0.1 | 0.1 | 0.1 | 0.1 | 0.1 | 0.1 |
| Rapid setting agent | 0.5 | 0.5 | 0.5 | 0.5 | 0.5 | 0.5 | 0.5 |
| Water content | 8 | 8 | 8 | 9 | 9 | 8 | 9 |

TABLE 8

| Examples | 62 | 63 | 64 | 65 | 66 | 67 |
|---|---|---|---|---|---|---|
| Refractory aggregates | | | | | | |
| Bauxite coarse particles | 31 | 31 | 31 | 31 | 31 | 31 |
| Bauxite intermediate particles | 25 | 25 | 25 | 25 | 25 | 25 |
| Bauxite fine particles | 23 | 23 | 23 | 23 | 23 | 23 |
| Refractory powder | | | | | | |
| Aluminous cement | 8 | 8 | 8 | 8 | 8 | 8 |
| Bayer alumina | 7 | 7 | 7 | 7 | 7 | 7 |
| Fumed silica | 6 | 6 | 6 | 6 | 6 | 6 |
| 88Al-12Si alloy powder (a) | 0.03 | 0.05 | 1 | — | — | — |
| 88Al-15Mg alloy powder (b) | — | — | — | 1 | — | — |
| Al powder | — | — | — | — | 1 | — |
| Dispersant | 0.01 | 0.1 | 0.1 | 0.1 | 0.1 | 0.1 |
| Rapid setting agent | 0.5 | 0.5 | 0.03 | 5 | 0.5 | 0.5 |
| Water content | 8 | 9 | 9 | 9 | 9 | 8 |

TABLE 9

| Examples | 55 | 56 | 57 | 58 | 59 | 60 | 61 |
|---|---|---|---|---|---|---|---|
| Flow index (mm) | >250 | >250 | >250 | >250 | >250 | >250 | >250 |
| Force feeding property | Good | Good | Good | Good | Good | Good | Good |
| Adhesion to wall surface | Good | Good | Good | Good | Good | Good | Good |
| Flow off of batch after application | Nil | Nil | Nil | Nil | Nil | Nil | Nil |
| Apparent porosity (%) | 12.4 | 12.5 | 12.7 | 12.9 | 13.2 | 12.6 | 12.8 |
| Bulk density (g/cc) | 2.84 | 2.84 | 2.83 | 2.82 | 2.80 | 28.5 | 2.81 |
| Flexural strength (kg/cm$^2$) | | | | | | | |
| After 1,100° C. × 24 hr | 121 | 125 | 123 | 121 | 118 | 120 | 119 |
| After 1,400° C. × 3 hr | 400 | 402 | 400 | 395 | 390 | 405 | 398 |
| Dimensional change (%) | 0.01 | 0.01 | 0.03 | 0.05 | 0.06 | 0.01 | 0.05 |
| Cracking | Nil | Nil | Nil | Nil | Nil | Nil | Nil |
| Explosion | Nil | Nil | Nil | Nil | Nil | Nil | Nil |
| Adhesion to wall of 500° C. | — | Good | Good | Good | Good | — | Good |
| Explosion or cracking | — | Nil | Nil | Nil | Nil | — | Nil |
| Falling off | — | Nil | Nil | Nil | Nil | — | Nil |

TABLE 10

| Examples | 62 | 63 | 64 | 65 | 66 | 67 |
|---|---|---|---|---|---|---|
| Flow index (mm) | >250 | >250 | >250 | >250 | >250 | >250 |
| Force feeding property | Good | Good | Good | Good | Good | Good |
| Adhesion to wall surface | Good | Good | Poor | Poor | Good | Good |
| Flow off of batch after application | Nil | Nil | Present | — | Nil | Nil |
| Apparent porosity (%) | 12.4 | 13.9 | — | — | 15.0 | 12.5 |
| Bulk density (g/cc) | 2.85 | 2.72 | — | — | 2.67 | 2.85 |
| Flexural strength (kg/cm$^2$) | | | | | | |
| After 1,100° C. × 24 hr | 120 | 96 | — | — | 75 | 120 |
| After 1,400° C. × 3 hr | 400 | 295 | — | — | 200 | 400 |
| Dimensional change (%) | 0.01 | 0.15 | — | — | Bulge | 0.01 |
| Cracking | Nil | Nil | — | — | Present | Nil |
| Explosion | Present | Nil | — | — | Nil | Present |
| Adhesion to wall of 500° C. | Good | Good | Fair | Poor | Good | Good |
| Explosion or cracking | Nil | Nil | Nil | — | Nil | Present |
| Falling off | Present | Nil | Present | — | Nil | Present |

EXAMPLE 68

The monolithic refractory composition of Example 56 was applied by spraying to a furnace wall of a minitandish furnace. The composition was applied by spraying in a thickness of 250 mm over an area of 1,000×1,000 mm on the inner surface of a heat insulting castable refractory formed in a thickness of 100 mm on the rear side. After curing the applied monolithic refractory, the applied refractory surface was heated by an oil burner.

The heating for drying was carried out so that the surface temperature was raised at a heating up rate of 200° C./hr to 1,000° C. The temperature distribution in the minitandish furnace was about ±20° C.

No explosion was observed during the drying operation, and after completion of the drying, no crack was observed on the surface of the furnace wall formed. Further, the furnace wall was cut out, and the cross section in the thickness direction was inspected, whereby no crack was observed.

EXAMPLE 69

The monolithic refractory composition of Example 58 was applied to the minitandish furnace, and the drying test were carried out, in the same manner as in Example 68. In this case, the surface temperature of the furnace wall was raised at a heating up rate of 300° C./hr to 1,400° C. for drying. No explosion was observed during the drying operation, and after completion of the drying, no crack was observed on the surface or the cross section of the furnace wall.

EXAMPLE 70

The monolithic refractory composition of Example 60 was applied to a minitandish furnace, and the drying test was carried out, in the same manner as in Example 68. In this case, the surface temperature of the furnace wall was raised at a heating up rate of 100° C./hr to 1,000° C. for drying. No explosion was observed during the drying operation, and after the drying, no crack was observed.

COMPARATIVE EXAMPLE 71

The monolithic refractory composition of Comparative Example 62 was applied to a minitandish furnace, and the drying test was carried out, in the same manner as in Example 68. The surface temperature of the furnace wall was raised at a heating up rate of 200° C./hr to 1,200° C. for drying. During the drying, explosion occurred, and a part of the furnace wall surface blew off. After completion of the drying, many cracks were observed on the furnace wall.

COMPARATIVE EXAMPLE 7

The monolithic refractory composition of Example 61 was applied to a minitandish furnace in the same manner as in Example 68, and the surface temperature of the furnace wall was raised at a heating up rate of 500° C./hr to 1,000° C. for drying.

During the drying operation, no explosion was observed, but after completion of the drying, a numerous cracks which appeared to be spalling were observed on the surface of the furnace wall.

From the foregoing results, an interrelation is observed as between the drying test by a minitandish furnace and the test on explosion with the composition, and it has been found that evaluation of the composition is applicable also to the evaluation of the process of forming a furnace wall under a rapid heating condition.

What is claimed is:

1. A self flowable batch prepared by mixing, together with at most 12 parts by weight of water, 100 parts by weight of a monolithic refractory composition comprising refractory aggregates, a refractory powder, an aluminum alloy powder and sodium tetraphosphate ($Na_6P_4O_{13}$) as a dispersant, wherein the aluminum alloy powder is contained in an amount of from 0.05 to 3 parts by weight per 100 parts by weight of the total amount of the refractory aggregates and the refractory powder, said self flowable batch having a flowability such that when the batch immediately after the mixing is fed to fill a truncated cone mold having open upper and lower ends and having an upper end inner diameter of 50 mm, a lower and inner diameter of 100 mm and a height of 150 mm, then the truncated cone mold is withdrawn upward, and the batch is left to stand still for 60 seconds, the mean spread diameter of the batch is at least 190 mm.

2. A monolithic refractory composition, which can be rapidly dried after being mixed with water and applied to a desired portion by casting or spraying to form a furnace wall, and which comprises refractory aggregates, a refractory powder, an aluminum alloy powder and sodium tetraphosphate ($Na_6P_4O_{13}$) as a dispersant, wherein the aluminum alloy powder is contained in an amount of from 0.04 to 5 parts by weight per 100 parts by weight of the total amount of the refractory aggregates and the refractory powder.

3. The monolithic refractory composition according to claim 2, wherein the aluminum alloy powder comprises from 60 to 95 wt % of Al and from 5 to 40 wt % of Si or Mg.

4. The monolithic refractory composition according to claim 2, wherein the aluminum alloy powder comprises from 85 to 93 wt % of Al and from 7 to 15 wt % of Si.

5. The monolithic refractory composition according to claim 2, wherein the aluminum alloy powder has a purity of at least 90 wt % as the total amount of Al and Si or Mg and contains at least 40 wt % of particles having a particle size of at most 0.074 mm.

6. The monolithic refractory composition according to claim 2, wherein the aluminum alloy powder is contained in an amount of from 0.1 to 2 parts by weight per 100 parts by weight of the total amount of the refractory aggregates and the refractory powder.

7. The monolithic refractory composition according to claim 2, wherein the refractory powder contains aluminous cement.

8. The monolithic refractory composition according to claim 2, wherein the refractory powder includes fumed silica.

9. A monolithic refractory composition, according to claim 2, which comprises 75–95 wt. % refractory aggregates, and 5–25 wt. % of a refractory powder, based upon the total amount of the refractory aggregates and refractory powder, and the dispersant in an amount of 0.02 to 1 parts by weight per 100 parts of said total amount of refractory aggregates and refractory powder.

* * * * *

UNITED STATES PATENT AND TRADEMARK OFFICE
CERTIFICATE OF CORRECTION

PATENT NO. : 5,783,510
DATED : July 21, 1998
INVENTOR(S) : Otojiro Kida, et. al.

It is certified that error appears in the above-identified patent and that said Letters Patent is hereby corrected as shown below:

Title page, item [54] and col. 1, line 2, delete the word -- WALL--.

Signed and Sealed this

Ninth Day of February, 1999

Attest:

*Attesting Officer*

*Acting Commissioner of Patents and Trademarks*